United States Patent [19]

Almond et al.

[11] Patent Number: 4,556,403
[45] Date of Patent: Dec. 3, 1985

[54] DIAMOND ABRASIVE PRODUCTS

[76] Inventors: Eric A. Almond, 34 Weston Ave., West Molesey, Surrey, KT8 9RG; Mark G. Gee, 20 Morland Close, Hampton, Teddington, Middlesex, both of England

[21] Appl. No.: 575,340

[22] Filed: Jan. 31, 1984

[30] Foreign Application Priority Data

Feb. 8, 1983 [GB] United Kingdom ............... 8303498

[51] Int. Cl.$^4$ .............................................. B24D 3/02
[52] U.S. Cl. ...................................... 51/308; 51/298
[58] Field of Search .................................... 51/308, 298

[56] References Cited

U.S. PATENT DOCUMENTS

| | | | |
|---|---|---|---|
| 2,495,606 | 1/1950 | Schaefer | 51/308 |
| 2,495,607 | 1/1950 | Schaefer | 51/308 |
| 3,523,773 | 8/1970 | Sears | 51/308 |
| 4,224,380 | 9/1980 | Bovenkerk et al. | 51/307 |

Primary Examiner—Paul Lieberman
Assistant Examiner—Willie J. Thompson
Attorney, Agent, or Firm—Curtis, Morris & Safford

[57] ABSTRACT

A diamond abrasive body which comprises a coherent, skeletal diamond mass constituting at least 70 percent by volume of the body and a glass phase comprising up to 30 percent by volume of the body uniformly dispersed throughout the diamond mass. The glass phase has a melting point in the range 800° to 1400° C. The abrasive body has good thermal stability and strength making it suitable for use as an insert for tools such as dressing tools and surface set drill bits. The abrasive body is produced by infiltrating molten glass into a coherent skeletal diamond mass. The glass phase is preferably transformed to a ceramic form by heat treatment of the infiltrated diamond mass.

14 Claims, No Drawings

DIAMOND ABRASIVE PRODUCTS

BACKGROUND OF THE INVENTION

This invention relates to diamond abrasive products.

Abrasive compacts are well known in the art and are used extensively in industry for the abrading of various workpieces. They consist essentially of a mass of abrasive particles present in an amount of at least 70 percent, preferably 80 to 90 percent, by volume of the compact bonded into a hard conglomerate. Compacts are polycrystalline masses and can replace single large crystals. The abrasive particles of compacts are invariably ultra-hard abrasives such as diamond and cubic boron nitride.

Abrasive compacts generally contain a second phase or bonding matrix which contains a catalyst (also known as a solvent) useful in synthesising the particles. In the case of cubic boron nitride examples of suitable catalysts are aluminium or an alloy of aluminium with nickel, cobalt, iron, manganese or chromium. In the case of diamond, examples of suitable catalysts are metals of Group VIII of the Periodic Table such as cobalt, nickel or iron or an alloy containing such a metal.

As is known in the art, diamond and cubic boron nitride compacts are manufactured under conditions of temperature and pressure at which the abrasive particle is crystallographically stable.

Abrasive compacts may be bonded directly to a tool or shank for use. Alternatively, they may be bonded to a backing such as a cemented carbide backing prior to being mounted on a tool or shank.

U.S. Pat. No. 4,224,380 describes a method of leaching out a substantial quantity of the catalyst from a diamond compact. The product so produced comprises self-bonded diamond particles comprising between about 70 percent and 95 percent by volume of the product, a metallic phase infiltrated substantially uniformly throughout the product, the phase comprising between about 0.05 percent and 3 percent by volume of the product, and a network of interconnected, empty pores dispersed throughout the product and defined by the particles and the metallic phase, the pores comprising between 5 percent and 30 percent by volume of the product. Leaching may be achieved by placing a diamond compact in a hot concentrated nitric-hydrofluoric acid solution for a period of time. This treatment with the hot acid leaches out the catalyst phase leaving behind a skeletal diamond structure.

SUMMARY OF THE INVENTION

According to the present invention, there is provided an abrasive body comprising a mass of diamond particles present in an amount of at least 70 percent by volume of the body and containing substantial diamond-to-diamond bonding to form a coherent skeletal mass and a second phase comprising up to 30 percent by volume of the body and dispersed through at least part of the skeletal mass, the second phase being a glass having a melting point in the range 800° to 1400° C.

The abrasive body of the invention was found to have good thermal stability, e.g. it can withstand temperatures of the order of 1200° C. in a vacuum of $10^{-4}$ Torr or better without significant graphitisation of the diamond occurring. Moreover the bodies have strength and rigidity. This combination of features makes them suitable as tool inserts for tools where high temperatures are generated during the use thereof, as for example in dressing tools, or where high temperatures are required during manufacture of the tool, as for example in surface set drill bits.

DETAILED DESCRIPTION OF THE INVENTION

The coherent skeletal diamond mass may be produced, for example, by producing an abrasive compact having a catalyst second phase and then removing the catalyst phase, for example, by leaching, following the teachings of the above-mentioned U.S. Patent Specification. Diamond masses produced in this manner will contain a minor amount of the catalyst phase dispersed through the mass.

Glasses are products of fusion which have been cooled to a rigid or solid condition without crystallising. Glasses are generally mixtures of oxides and oxide-containing compounds such as silicates, borates and phosphates. The glasses which are suitable for the practice of this invention are those which have melting points in the range 800° C. to 1400° C. The glass will preferably also have a low viscosity in the molten state and a low volatility.

The diamond mass will typically comprise 70 to 95 percent by volume of the product with the glass phase comprising the major part of the remainder of the product. As mentioned above, the product may also contain a small amount of a catalyst phase.

It is preferred that the glass is substantially uniformly dispersed throughout the diamond mass.

The glass is preferably heat treated to transform it to a ceramic form. This transformation increases the toughness of the abrasive body.

The abrasive bodies of the invention may take on any of a variety of shapes depending on the use to which they are put. Examples of suitable shapes are disc, triangular, cube and rectangular.

The abrasive products of the invention may be produced by providing a coherent skeletal diamond mass, contacting that mass with a mass of a glass as described above in molten form, and causing the glass to infiltrate the diamond mass. The latter two steps are carried out in a non-oxidising atmosphere such as a vacuum or an inert gas. Preferably, the glass is caused to infiltrate substantially uniformly throughout the diamond mass.

In one form of the method, the diamond mass is immersed in a body of molten glass and infiltration of the glass into the diamond mass caused by applying a pressure to the body of molten glass. The pressure may be applied in an autoclave, an isostatic press or in a high temperature/high pressure press under conditions of elevated temperature and pressure at which the abrasive is crystallographically stable. The pressure which is applied to cause infiltration will vary according to the nature of the glass, degree of porosity of the diamond mass and apparatus used. By way of example, it can be stated that where an autoclave is used the pressure will rarely exceed 100 bars and this pressure will typically be maintained for a period of up to 60 minutes.

Another suitable method of introducing a molten glass phase into the diamond mass is to contact one surface of the mass with the molten glass and then create a lower pressure at a surface of the mass opposite to the surface in contact with the molten glass thereby causing the glass to be drawn into the skeletal mass. The pressure difference between the two surfaces may be produced by applying a suction to the surface of the mass opposite to that in contact with the molten glass or by applying pressure to the molten glass or by using both such methods.

Infiltration of the glass phase into the diamond mass may be improved by improving the wettability of the mass. Improving the wettability of the mass may be achieved by methods known in the art. For example, the wettability thereof may be improved by graphitisation, by coating or by etching the internal structure of the skeletal mass prior to infiltration.

After infiltration, the glass phase is preferably transformed to a ceramic form by heat treating the infiltrated diamond mass. Heat treatment may take place in a non-oxidising atmosphere such as a vacuum or an inert gas. However, heat treatment may also be carried out in the presence of air because the infiltrated glass acts as a protective film for the diamond mass. The heat treatment is typically carried out at a temperature in the range 700° to 1100° C. and these conditions maintained for a period of up to 240 minutes.

As mentioned above, the abrasive body of the invention may be used as an insert for a variety of abrasive tools. In order to improve the bonding characteristics of the abrasive product to the matrices of such tools, the outer surface of the product may be etched or coated with a surface coating chosen to bond effectively with the matrix of the tool in which it is to be used.

The invention is illustrated by the following non-limiting examples.

EXAMPLE 1

A diamond compact having a cobalt second phase was produced in the conventional manner. The diamond content of the compact was 85 percent by volume with the cobalt constituting the balance of the compact. The diamond compact was placed in a strong acid medium for a period of several days to remove the cobalt phase. The resulting product was a polycrystalline mass of diamond particles forming a coherent skeletal body or mass and having interspersed therethrough interconnected pores substantially free from cobalt.

The acid treated product was placed in a container and completely surrounded by a powdered glass which comprised silicates and oxides of boron, magnesium, aluminium and barium. The container was placed in an autoclave and a temperature of 1000° C. applied thereto to cause the glass to melt. An argon pressure of about 10 bars was applied to the molten glass thereby causing the glass to infiltrate uniformly into a substantial amount of the pores of the diamond mass. The temperature was reduced to allow the glass to solidify. Excess glass was removed from the diamond mass. The resulting product was found to have a strength and rigidity comparable with the original diamond compact and was further found to be thermally stable up to 1200° C. under a vacuum of $10^{-4}$ Torr.

EXAMPLE 2

A diamond compact was acid treated as described in Example 1 to produce a coherent skeletal diamond mass. This diamond mass and fragments of a glass containing lithium oxide, boron oxide, silica and lithium phosphate were heated together at 950° C. in a vacuum of less that 0,001 millibars and allowed to cool to form a solid mass. Heating to 950° C. caused the glass to melt. The mass was then heated to 1000° C. in an autoclave at a pressure of 0.1 millibars, held at this temperature for 10 minutes. This heat treatment allowed any gases present in the glass to escape. The mass was then heated at this temperature for a further 10 minutes under a pressure of 30 bars of argon, and cooled under pressure. An examination of the resulting product showed that the glass had infiltrated uniformly to the centre of the diamond mass and had completely filled the pores thereof.

The glass phase of the abrasive product was converted into a ceramic phase by heat treatment of the product at a temperature of 750° C. for 30 minutes.

EXAMPLE 3

A coherent skeletal diamond mass was produced in the manner set out in Example 1. This mass and fragments of a glass mixture containing equal amounts of glass containing lithium oxide, boron oxide, silica, lithium phosphate and another glass containing alumina, barium oxide, magnesia were heated together at 1000° C. in a vacuum of less than 0.001 millibars and allowed to cool to form a solid mass. Heating to 1000° C. caused the glass mixture to melt. The mass was then heated to 1000° C. in an autoclave at a pressure of 0.1 millibars, held at this temperature for 10 minutes under a pressure of 28 bars of argon and then cooled under pressure. As in Example 2, it was found on examination that the glass had infiltrated to the centre of the diamond mass and filled the pores thereof completely.

EXAMPLE 4

A coherent skeletal diamond mass was produced in the manner set out in Example 1. This mass and fragments of a glass containing aluminium oxide, barium oxide and magnesia were heated together in an autoclave at 800° C. under a pressure of 0.1 millibars (which caused the glass to melt) and then 1000° C. under 20 bars pressure of argon which was held for 10 minutes. Thereafter the mass was allowed to cool under pressure. An examination of the resulting product showed that the glass had infiltrated to the centre of the diamond mass and had filled the pores thereof completely.

The glass phase of the abrasive product was converted into a ceramic phase by heat treatment of the product at a temperature of 750° C. for 30 minutes.

We claim:

1. An abrasive body comprising a mass of diamond particles present in an amount of at least 70 percent by volume of the body and containing substantial diamond-to-diamond bonding to form a coherent skeletal mass and a second phase comprising up to 30 percent by volume of the body and dispersed through at least part of the skeletal mass, the second phase being a glass having a melting point in the range 800° to 1400° C.

2. An abrasive body according to claim 1 wherein the glass is a mixture of oxides and oxide-containing compounds.

3. An abrasive body according to claim 2 wherein the oxide-containing compounds are selected from silicates, borates and phosphates.

4. An abrasive body according to claim 1 wherein the diamond mass comprises 70 to 95 percent of the body and the glass phase comprises the major part of the remainder of the product.

5. An abrasive body according to claim 1 wherein the glass is uniformly dispersed throughout the diamond mass.

6. An abrasive body according to claim 1 wherein the glass is transformed to a ceramic form.

7. A method of producing an abrasive body comprising a mass of diamond particles present in an amount of at least 70 percent by volume of the body and containing substantial diamond-to-diamond bonding to form a coherent skeletal mass and a second phase comprising up to 30 percent by volume of the body and dispersed through at least part of the skeletal mass, the second phase being a glass having a melting point in the range 800° to 1400° C. including providing a mass of diamond particles containing substantial diamond-to-diamond bonding to form a coherent skeletal mass, contacting the mass with a glass in molten form and having a melting point in the range 800° to 1400° C., and causing the glass to infiltrate at least a part of the skeletal mass, the latter two steps being carried out in a non-oxidising atmosphere.

8. A method according to claim 7 wherein the glass is caused to infiltrate uniformly throughout the diamond mass.

9. A method according to claim 7 wherein the diamond mass is immersed in a body of molten glass and a pressure is applied to the molten glass to cause it to infiltrate the mass.

10. A method according to claim 7 wherein a surface of the diamond mass is contacted with a body of molten glass and a lower pressure is created on a surface of the diamond mass opposite to the surface in contact with the molten glass thereby causing the glass to be drawn into the skeletal mass.

11. A method according to claim 7 wherein the infiltrated skeletal mass is heat treated to transform the glass into a ceramic form.

12. A method according to claim 9 wherein the infiltrated skeletal mass is heat treated to transform the glass into a ceramic form.

13. A method according to claim 11 wherein the heat treatment is carried out at a temperature in the range 700° to 1100° C. and this temperature is maintained for a period of up to 240 minutes.

14. A method according to claim 12 wherein the heat treatment is carried out at a temperature in the range 700° to 1100° C. and this temperature is maintained for a period of up to 240 minutes.

* * * * *